(12) United States Patent
Keller

(10) Patent No.: US 8,089,495 B2
(45) Date of Patent: Jan. 3, 2012

(54) METHOD FOR THE DISPLAY OF STANDARDIZED LARGE-FORMAT INTERNET PAGES WITH FOR EXAMPLE HTML PROTOCOL ON HAND-HELD DEVICES WITH A MOBILE RADIO CONNECTION

(75) Inventor: Walter Keller, Ratingen (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 10/473,850

(22) PCT Filed: Mar. 27, 2002

(86) PCT No.: PCT/DE02/01120
§ 371 (c)(1),
(2), (4) Date: Jan. 20, 2004

(87) PCT Pub. No.: WO02/082418
PCT Pub. Date: Oct. 17, 2002

(65) Prior Publication Data
US 2004/0131043 A1 Jul. 8, 2004

(30) Foreign Application Priority Data

Apr. 6, 2001 (DE) .................................. 101 17 457

(51) Int. Cl.
*G09G 5/34* (2006.01)
*G09G 5/373* (2006.01)
(52) U.S. Cl. ......................................... 345/667; 345/682
(58) Field of Classification Search .......... 345/667–671, 345/672, 682, 684; 715/864
See application file for complete search history.

(56) References Cited

U.S. PATENT DOCUMENTS

| | | | | |
|---|---|---|---|---|
| 4,366,475 A | * | 12/1982 | Kishi et al. | 345/668 |
| 4,720,703 A | * | 1/1988 | Schnarel et al. | 345/163 |
| 4,751,507 A | * | 6/1988 | Hama et al. | 715/784 |
| 5,075,673 A | * | 12/1991 | Yanker | 345/163 |
| 5,600,765 A | * | 2/1997 | Ando et al. | 345/668 |
| 5,615,384 A | * | 3/1997 | Allard et al. | 715/800 |
| 5,729,219 A | * | 3/1998 | Armstrong et al. | 341/20 |
| 5,801,677 A | | 9/1998 | Obata | |
| 6,012,030 A | | 1/2000 | French-St. George | |
| 6,081,277 A | | 6/2000 | Kojima | |
| 6,184,859 B1 | * | 2/2001 | Kojima | 345/629 |

(Continued)

FOREIGN PATENT DOCUMENTS

EP 0651543 5/1995

(Continued)

*Primary Examiner* — Jeffery A Brier
(74) *Attorney, Agent, or Firm* — Cooper & Dunham LLP

(57) ABSTRACT

A method for the display of standardized Internet pages (for example, in HTML or XML standard), generated for display on large-size screens, on a small display on hand-held devices (mini-computer, PDA or mobile radio device) is disclosed, in which the hand-held device can be provided with a mobile radio connection to the internet. A virtual large image memory is maintained in the device. Within the large virtual image the device display can be freely displaced as a readable image section. A zoom function permits an overview and coarse positioning of the detailed representation. The detailed representation can be continuously moved around within the virtual image in the form of a screen section by means of a pointer device (mouse pointer) by moving the mouse pointer to the display edge (and beyond). Switching can be performed at any time between the display modes.

3 Claims, 5 Drawing Sheets

U.S. PATENT DOCUMENTS

| | | | |
|---|---|---|---|
| 6,441,927 B1 * | 8/2002 | Dow et al. | 358/473 |
| 6,466,203 B2 * | 10/2002 | Van Ee | 345/173 |
| 6,928,461 B2 * | 8/2005 | Tuli | 709/203 |
| 7,023,572 B2 * | 4/2006 | Tuli | 358/1.15 |
| 2002/0030699 A1 * | 3/2002 | Van Ee | 345/810 |
| 2002/0034964 A1 * | 3/2002 | Bannai et al. | 455/556 |
| 2002/0093493 A1 * | 7/2002 | Michaeli et al. | 345/173 |
| 2002/0115477 A1 * | 8/2002 | Singh | 455/566 |

FOREIGN PATENT DOCUMENTS

| | | |
|---|---|---|
| EP | 0825514 | 2/1998 |
| EP | 0964590 | 12/1999 |
| EP | 1055993 | 11/2000 |
| EP | 1168293 | 1/2002 |
| GB | 2316466 | 2/1998 |
| JP | 7234664 | 9/1995 |
| WO | WO9707467 | 2/1997 |
| WO | WO9918495 | 4/1999 |
| WO | WO9928812 | 6/1999 |
| WO | WO0068930 | 11/2000 |
| WO | WO0246903 | 6/2002 |
| WO | WO02084466 | 10/2002 |

* cited by examiner

METHOD FOR THE DISPLAY OF STANDARDIZED LARGE-FORMAT INTERNET PAGES WITH FOR EXAMPLE HTML PROTOCOL ON HAND-HELD DEVICES WITH A MOBILE RADIO CONNECTION

BACKGROUND OF THE DISCLOSURE

1. Field of the Disclosure

The present disclosure relates to a method for displaying Internet pages and, more specifically, to a method for displaying standardized Internet pages, for example using HTML protocol in handheld terminals with mobile radio access.

2. Description of the Related Art

The Internet is today a popular means of communication with user numbers which are rising exponentially. One of the most important applications on the Internet is the World Wide Web (WWW), which is operated on the basis of Hypertext Markup Language (HTML) (recently also XML—a protocol extension), see Dr. Sidnie Feit, TCP/IP, McGraw-Hill USA 1999, ISBN 0-07-022069-7, pp. 650 ff. The domestic or company personal computer (PC) is used as an access unit in this context. It is operated with an Internet browser (for example Microsoft Explorer or Netscape Navigator) and, when required, access software for Internet access (using an Internet Service Provider), which provides the "client application". The remote station is a server or host computer on the Internet which provides the desired information via HTML pages. The HTML protocol is transmitted using TCP/IP protocol as means of transport. All protocols have been standardized by the IETF (Internet Engineering Task Force) and are constantly being extended.

As a result of ergonomic sensitization and falling prices on the appliances market, it is now possible to regard a 17-inch PC monitor with a resolution of 1024×768 pixels as standard.

These visual display units can display HTML pages excellently. Since it is not usual to pay for information on the Internet to date, the service providers make a living primarily from advertising revenue. Advertisements pop up as colorful still or moving images on the HTML pages, with use being made of the large-area monitor.

On the other hand, digital packet-oriented transmission services are currently being introduced in the mobile radio sector (GSM-GPRS, or future UMTS). These services allow TCP/IP protocols to be transmitted and allow rapid Internet access (Connect Heft 18, 24.08.200, page 15, Mit Tempo ins Netz [Speeding into the Network]). If a notebook or a PC with an ergonomic screen connected to the mobile radio (mobile phone) is not currently being used, but rather the display on the mobile terminal itself is being used as a visual display unit, considerable problems arise, however.

Apart from the fact that the technical opportunities for displaying HTML pages on the unit's display do not yet exist, unsolvable visual problems arise. The information displayed would simply be too small for it to be able to be read by the human eye. The human eye is physiologically no longer able to resolve the dense content of a screen with a 40 cm diagonal following a reduction to a format with a 3-6 cm diagonal, i.e. it is generally no longer possible to read such a page.

However, this means that the entire worldwide stock of Internet pages cannot be used for mobile operation with handheld terminals, such as mobile phones or PDAs (Personal Digital Assistant)!

This was identified in good time, which means that the industry devised a remedy. New protocols, such as WML (Wireless Markup Language) or WAP (Wireless Application Protocol) are being standardized. Connect Heft 18, 24.08.2000 (pp. 18 ff, WAP Report) gives an overview of the available services and the depiction quality of the displays. The basic method for wireless services is based on displaying reduced clearly readable information on the displays.

A drawback of the practice, however, is that the entire stock of HTML pages on the Internet cannot be used for this method and WAP pages need to be recreated and maintained separately.

BRIEF DESCRIPTION OF THE SEVERAL VIEWS OF THE DRAWINGS

A more complete appreciation of the present disclosure and many of the attendant advantages thereof will be readily obtained as the same becomes better understood by reference to the following detailed description when considered in connection with the accompanying drawings, wherein.

BRIEF SUMMARY OF THE DISCLOSURE

Figure 1:
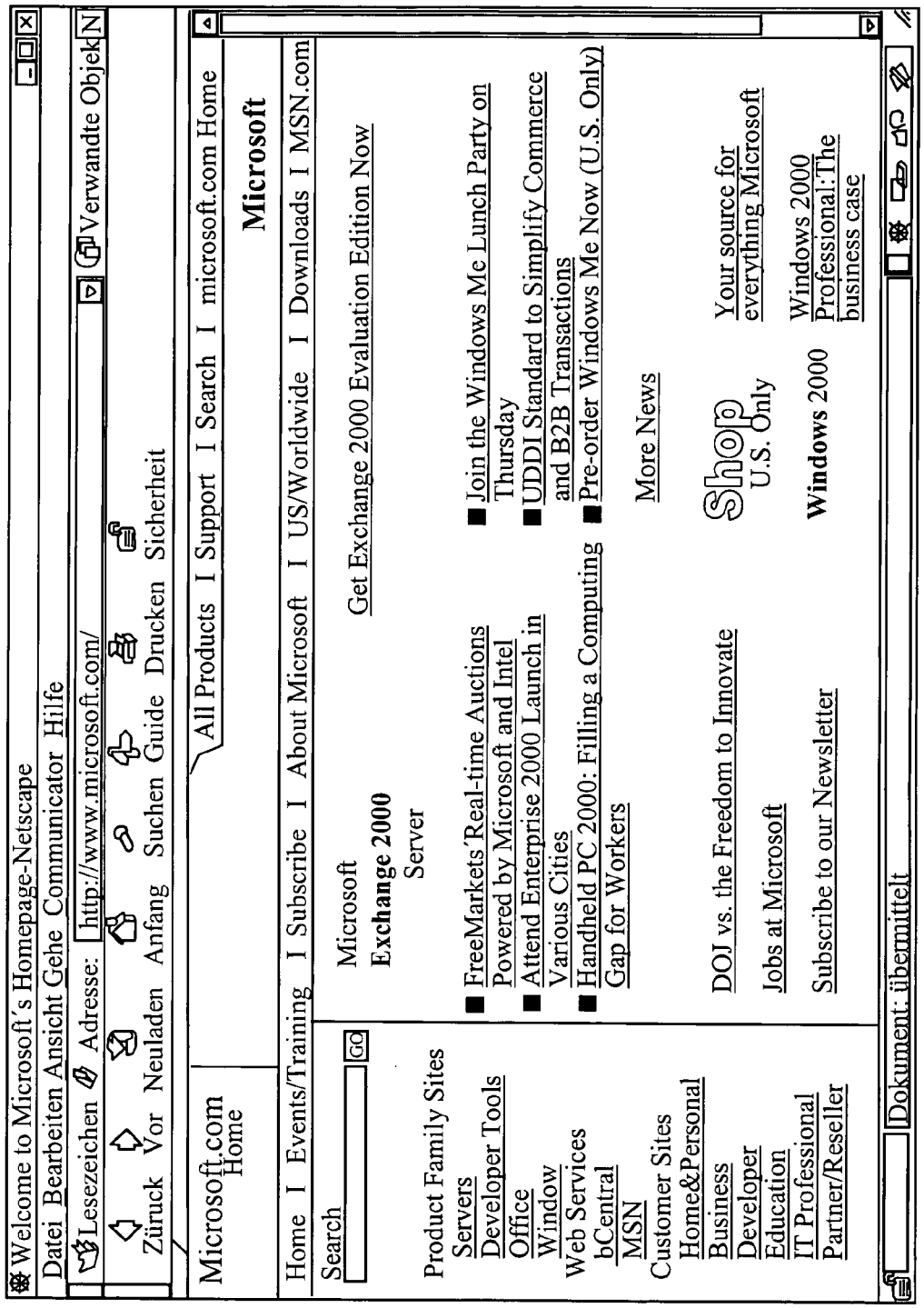
FIG. 1 is an Internet page shown as an example of an HTML page.

The present disclosure is based on the object of proposing a method on the basis of which conventional standardized Internet pages, for example based on HTML or XML protocol, can be displayed using small-format handheld terminals (for example mobile phone or personal digital assistant PDA) with small-format displays.

The present disclosure is explained with reference to figures of the drawing which in this case show just one possible embodiment using the example of a schematically depicted unit.

DETAILED DESCRIPTION

FIG. 1 shows an arbitrary Internet page with a browser window by way of example. The browser window is important so that the settings can be seen and the "address" field can be used to input the "URL" for navigating on the Internet.

Figure 2:
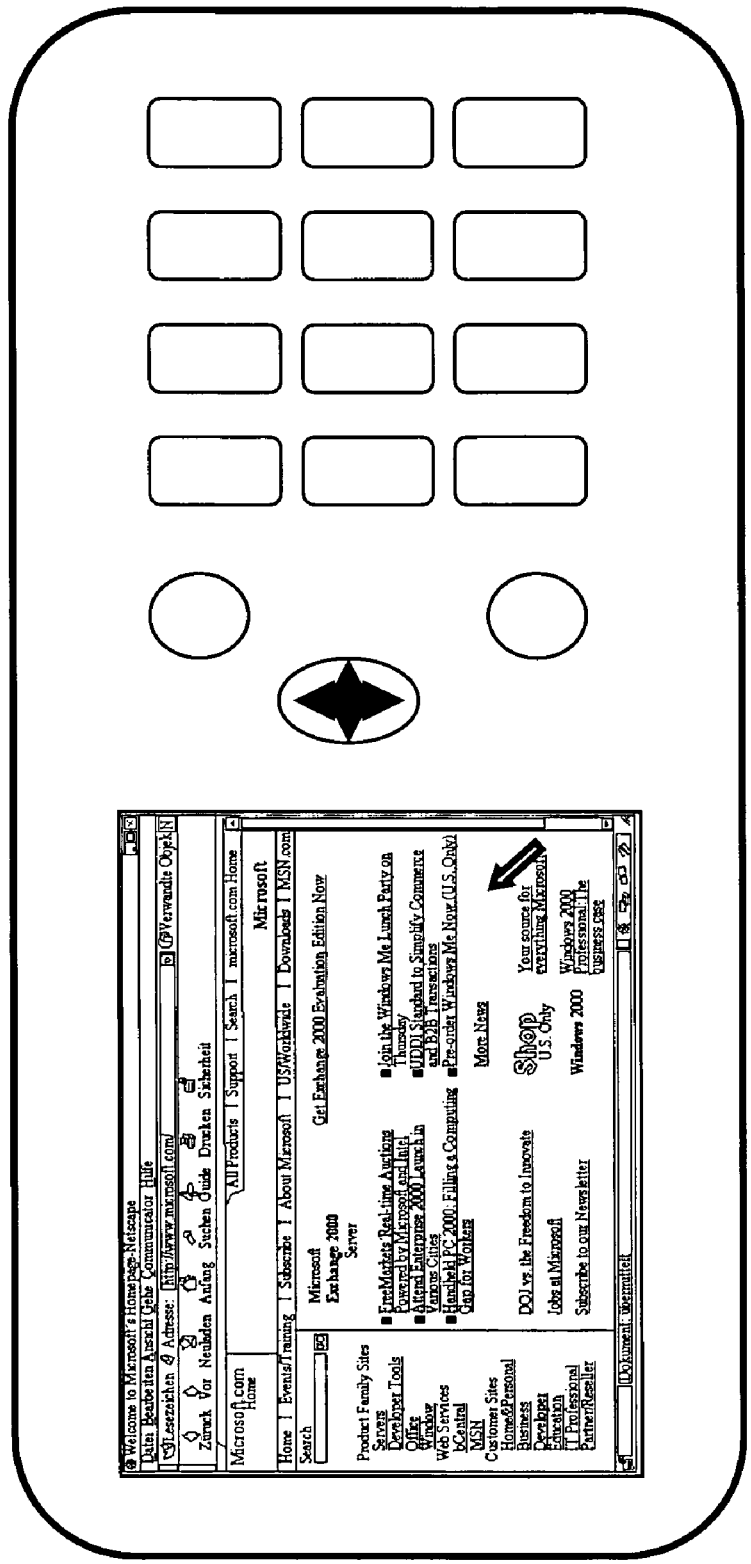
FIG. 2 is a reduced representation of the Internet page of FIG. 1 shown on a small display of a mobile radio.

FIG. 2 shows the result when this Internet page is shrunk to a realistic display format. In this case, the terminal size in the depiction corresponds roughly to the actual size of a mobile radio, and the display is already shown very large. It is no longer possible to read anything in this case.

Figure 3:
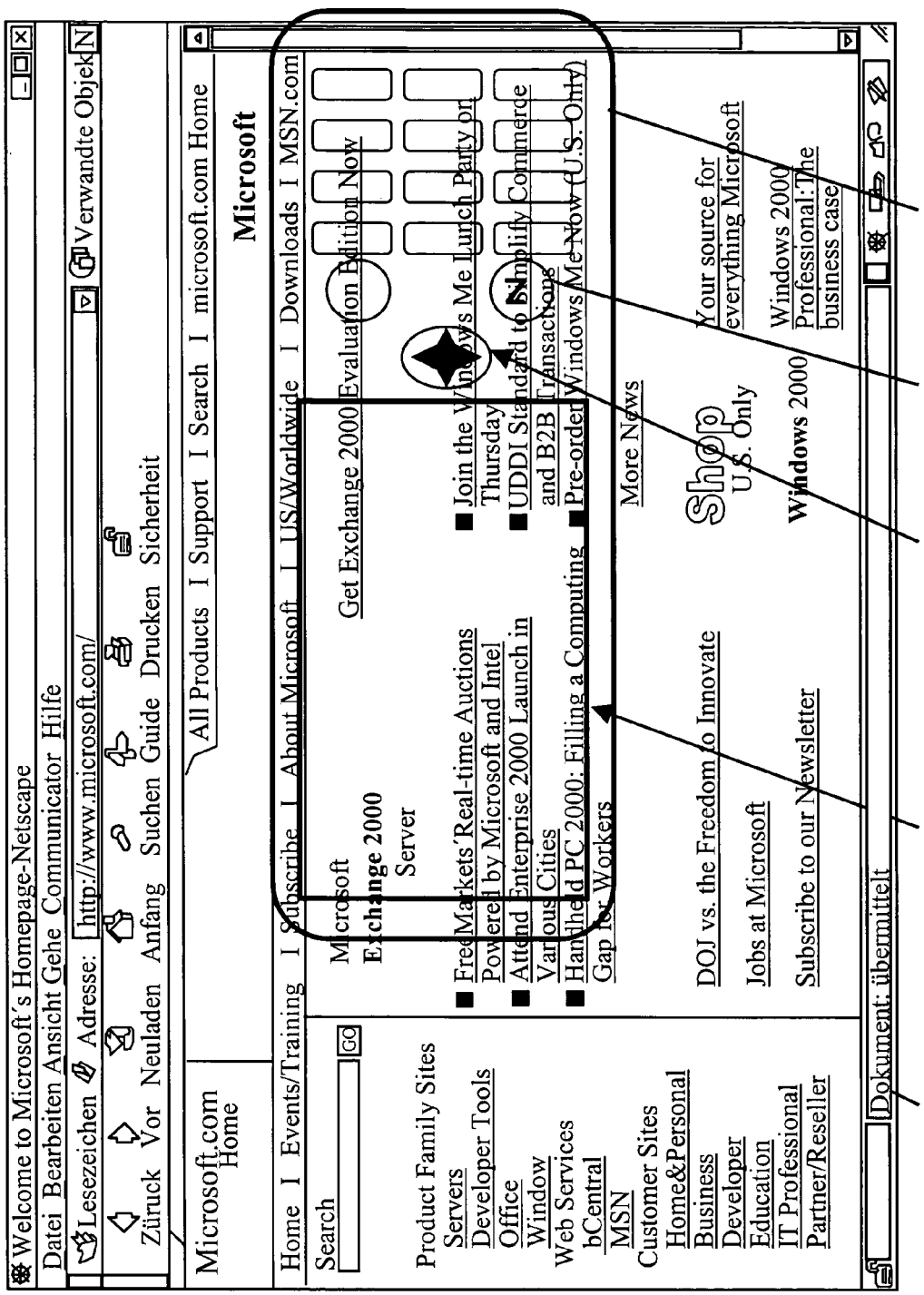
FIG. 3 is the small display of FIG. 2 superimposed over a virtual screen of the Internet page shown in FIG. 1 illustrating how the small display represents a readable portion of the virtual screen.

FIG. 3 shows the practice in line with the present disclosure. The HTML page customary on the Internet, optionally with a browser field, is used for display. In this case, the information shown is reduced to a degree which can still be read (3.1) and is displayed in portions (3.3) on the display of the mobile radio (3.2). This method can be used both for HTML pages where one page fills a larger screen and for those which exceed the scope of display of larger screens and are usually transported over the available screen using a scrollbar control at the side (in the case of the usual browsers from Microsoft and Netscape).

A fundamental requirement for the acceptance and hence for the commercial success of such a solution is ergonomic control (operation/navigation) of the displayed content on the display. This is implemented in the following manner.

The initial basis for the explanation is full reduction of the HTML page to the existing display format. This representation serves as an overview for coarse identification of the location in question with the desired information. A pointer instrument (comparable to the mouse pointer on a PC) is moved to the position in question, e.g. using a positioning key (3.4), by means of voice control or by means of either a stylus or a finger on a touch-sensitive display. A zoom key (3.5) is then pressed in order to change over to an enlarged display. This can be done continuously or in at least two stages (large/small). Optionally, this function can also be triggered by a sensitive display. The result of this enlargement can be seen in a portion of the display (3.3) (see FIG. 3). Pressing a key again switches back to the reduced display, after which a new selection can be made.

In addition, when the display is enlarged, the area shown can be chosen as desired as a portion of a virtual larger screen by repositioning the pointer function, in which case the image portion is shifted, preferably continuously, over the virtual image when the pointer instrument hits one of the display edges. There are thus two alternative methods available for conveniently navigating the small displayed content on the display within a larger virtual image. The keys used can be engaged repeatedly for other functions. In addition, the two tactile elements used for the display control should be arranged on the front, side or back of the unit such that they can be controlled with one hand without changing the grip position. The technical implementation involves two image stores being provided.

A large image store stores the virtual representation. In this case, the current image portion is copied to the smaller image store, which is used as a buffer store for the display. In an alternative form, part of the large image store is used as a display memory by virtue of the memory areas which are relevant to the respective displayed content on the display being used as memory addresses (pixel vectors) for the displayed content on the display. This embodiment saves memory space and, in particular, copying time. The reduced full display, and different enlargements, stipulate a second image store for the displayed content on the display, however, with the displayed content on the virtual image being reduced to the smaller measure by means of computer conversion (or removal of pixels). The remaining virtual image store ensures that it is always possible to revert to a larger representation without losing image information through prior reduction.

FIG. 3 shows just the control elements which are required in an appropriate sense for controlling the display. To give a better view, the keys are shown on the top of the housing, merely by way of example. Other control elements for functions of the unit are not shown, since they are not fundamental within the context of the present disclosure.

Figure 4:
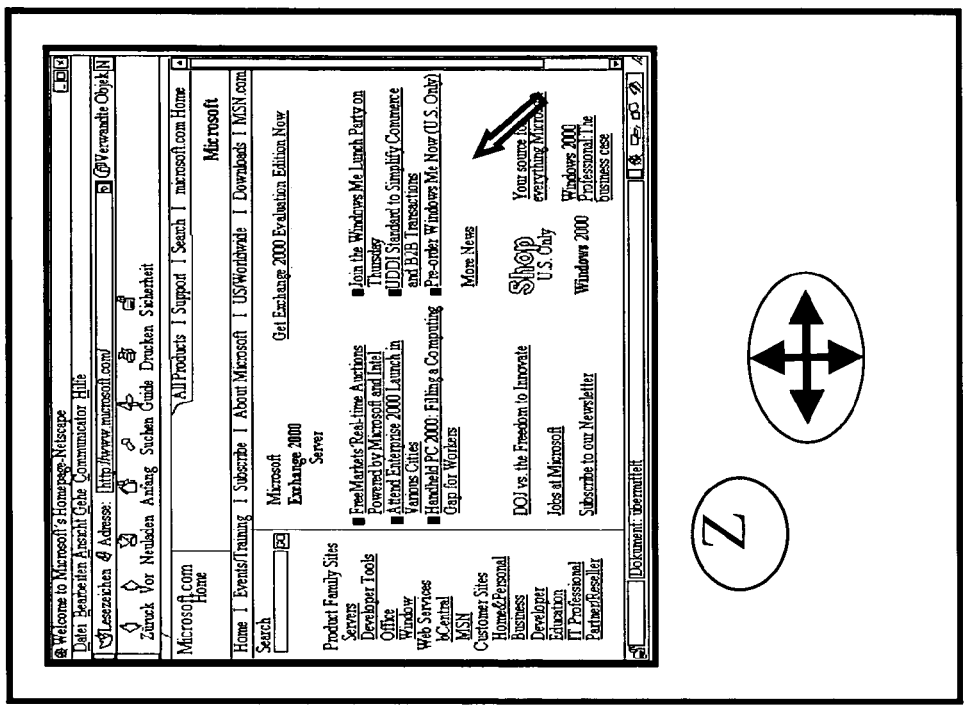
FIG. 4 is a reduced representation of the Internet page of FIG. 1 shown on a small display of a PDA.
Figure 5:
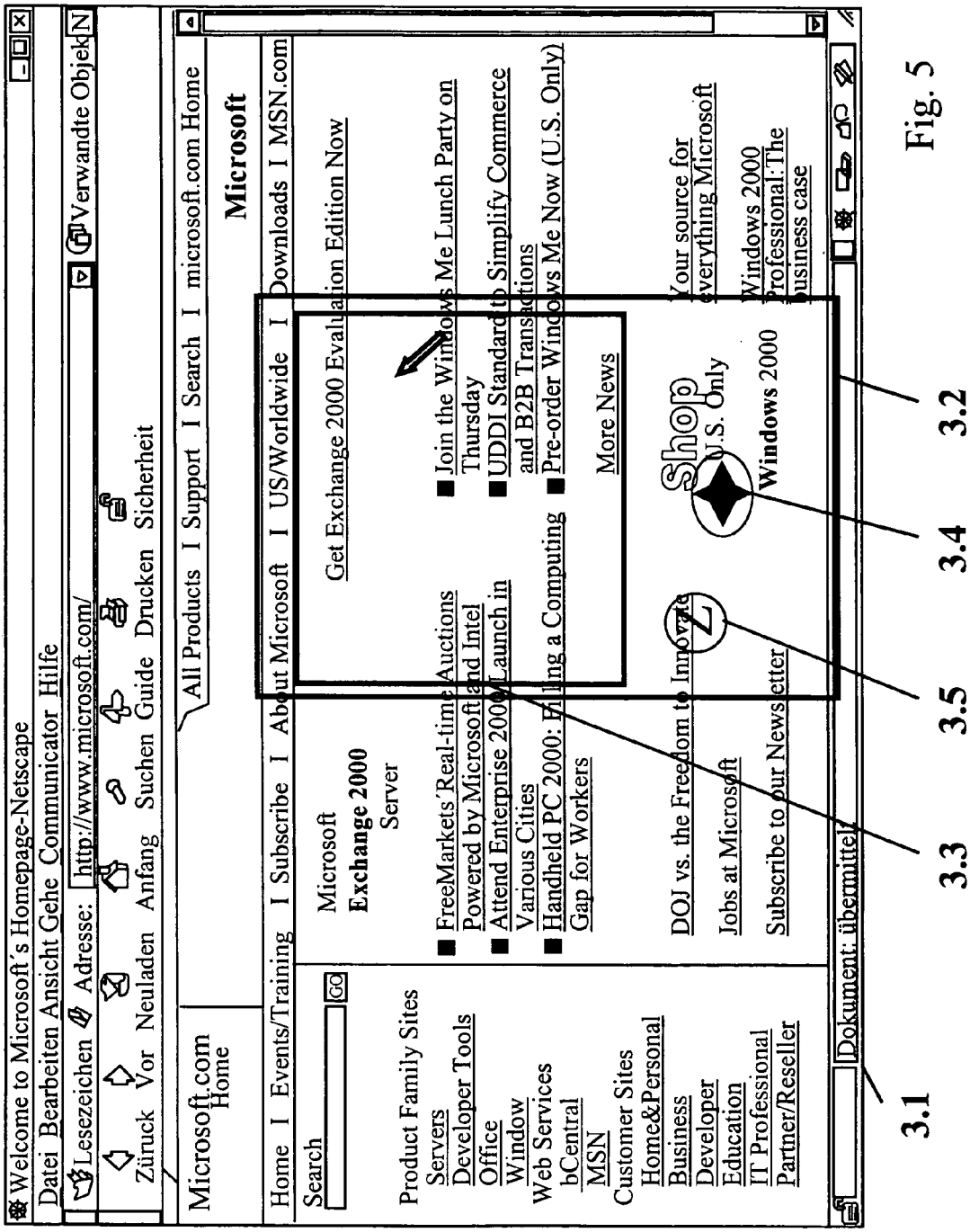
FIG. 5 is the small display of FIG. 4 superimposed over a virtual screen of the Internet page shown in FIG. 1 illustrating how the small display represents a readable portion of the virtual screen.

FIGS. 4 and 5 show the same circumstances for a PDA (usual unit format).

The invention claimed is:

1. A handheld device for displaying a standardized full image Internet page created for display on large-area displays using HTML or XML protocol, said handheld device comprising:

a display, said display being relatively small when compared to said large-area displays;

a first screen memory storing the full image Internet page as a large-format full image virtual screen;

a second screen memory used as a display buffer memory, the display buffer memory storing portions of contents of the large-format full image virtual screen being displayed on the display of the handheld device;

a positioning key tactile element arranged on a front of the handheld device for thumb control and for positioning a pointer device on the display of the handheld device to select an area which is to be enlarged or reduced, where said positioning key tactile element allows the pointer device to be freely positioned on the display of the handheld device such that by moving the pointer device to a display edge on the display of the handheld device, the portion of contents of the large-format full image virtual screen being displayed is continuously shifted and displayed; and a zoom key tactile element arranged on a back of the handheld device for middle-finger control for enlarging or reducing the selected area either to a clearly readable enlarged format, or to a point where a desired level of enlargement has been achieved, wherein the two tactile elements are arranged ergonomically on the handheld device such that it is possible to control both keys with one hand without changing the respective grip position, and wherein when displaying portions of contents of the large-format full image on the display, content for the display buffer memory is selectively obtained by performing a copy operation for copying the portions of the contents of the large-format full image virtual screen from the first memory to the display buffer memory or by use of mathematical or combinational logic functions including zoom functions; or copying a current display area from the virtual screen to the display buffer memory is dispensed with and the display buffer's memory positions are used within the virtual screen as a storage location vector for the display electronics.

2. A handheld device as recited in claim 1, wherein the positioning to select an area which is to be enlarged is performed using a stylus or finger on a touch-sensitive screen on the handheld device, using a tactile multicoordinate function.

3. A handheld device as recited in claim 1, wherein a user is capable of moving back and forth between the full image virtual screen and the image portion of the virtual larger image without losing image information through prior image reduction.

* * * * *